United States Patent [19]

Brandel et al.

[11] Patent Number: 4,963,374
[45] Date of Patent: Oct. 16, 1990

[54] MICROWAVE POPCORN BAG WITH UNPOPPED KERNELS SEPARATOR SCREEN

[75] Inventors: Charles W. Brandel, Arlington Heights; San Kim, Chicago; Charles S. Wiecek, Glen Ellyn; Richard F. Heinze, Northbrook, all of Ill.

[73] Assignee: Food Materials Corporation, Chicago, Ill.

[21] Appl. No.: 331,869

[22] Filed: Apr. 3, 1989

[51] Int. Cl.$^5$ ............................ A23L 1/25; A23L 1/18
[52] U.S. Cl. .................................. 426/107; 206/235; 206/680; 426/111; 426/112; 426/115; 426/118; 426/234
[58] Field of Search ............... 426/107, 111, 112, 113, 426/115, 118, 234, 243, 124; 99/323.5, 323.11; 209/235, 259, 373, 680

[56] References Cited

U.S. PATENT DOCUMENTS

| | | | |
|---|---|---|---|
| 609,160 | 8/1898 | McWithey | 99/323.11 |
| 771,893 | 10/1904 | Barton | 99/323.11 |
| 956,224 | 4/1910 | Stine et al. | 99/323.11 |
| 1,198,938 | 9/1916 | McClarrinon | 99/323.5 |
| 1,208,239 | 12/1916 | Traver | 99/323.11 |
| 1,965,040 | 7/1934 | Kelly | 109/370 |
| 2,158,460 | 6/1937 | Knapp . | |
| 2,828,858 | 4/1958 | Tooke | 426/112 |
| 2,858,970 | 11/1958 | Barnes et al. | 426/107 |
| 2,865,768 | 12/1958 | Barnes et al. | 426/111 |
| 2,970,920 | 2/1961 | Forkner | 426/115 |
| 3,159,096 | 12/1964 | Tocker | 426/115 |
| 3,973,045 | 8/1976 | Brandberg et al. | 426/111 |
| 4,038,425 | 7/1977 | Brandberg et al. | 426/107 |
| 4,132,811 | 1/1979 | Standing et al. | 426/107 |
| 4,457,435 | 7/1984 | Truman | 209/683 |
| 4,503,559 | 3/1985 | Warnke | 383/40 |
| 4,571,337 | 2/1986 | Cage et al. | 426/107 |
| 4,678,882 | 7/1987 | Bohrer et al. | 426/107 |
| 4,716,061 | 12/1987 | Winter | 426/107 |

FOREIGN PATENT DOCUMENTS 678697 1/1964 Canada ............................. 99/323.5

OTHER PUBLICATIONS

Article from 28/Kiwanis Magazine/Mar. 1989.
"Susceptors in Packages", Packaging Technology, Jul. 1987, pp. 120–122.
"Designing Microwave Packaging with . . . Receptor Films", Food Engineering, Oct. 1988, pp. 50–53.
"Microwaveable Popcorn Flavors are Heat Stable, Disperse Evenly", Food Processing, Jul. 1987, two pages.

Primary Examiner—Donald E. Czaja
Assistant Examiner—D. Workman
Attorney, Agent, or Firm—Hill, Van Santen, Steadman & Simpson

[57] ABSTRACT

A package structure for microwave popping of popcorn comprises a conventional tubular body bag wherein a closed bottom end minor length portion is folded over onto a major length portion defining a combined unpopped popcorn space and popped popcorn chamber, and a separator screen is secured across the body between the minor and major length portions at the line along which the minor portion is folded over onto the major portion. The separator screen has screen holes for shaking out separation of spent unpopped popcorn kernels from popped popcorn within the expanded bag chamber into the pocket under the separator screen. A rim about the screen holes blocks return of the spent unpopped kernels from the pocket to the popped popcorn chamber.

18 Claims, 2 Drawing Sheets

MICROWAVE POPCORN BAG WITH UNPOPPED KERNELS SEPARATOR SCREEN

BACKGROUND OF THE INVENTION

The present invention relates to the art of microwave popcorn popping, and is more particularly concerned with a new and improved in-bag popping arrangement equipped for efficient separation of spent unpopped kernels from the popped kernels resulting from a microwave popping event.

In view of the growing popularity of in-bag microwave popping of popcorn, there has been considerable attention to supplying the popcorn with selected flavorings, both liquid, paste or dry flavorings, some of which are essentially nonsticky on the popped popcorn, while others are essentially sticky at least during the heated phase of the popping cycle.

In virtually every batch of popped popcorn, a number of kernels may, and generally do, remain unpopped. Where the in-bag microwave popped popcorn has been supplied with or without nonsticky flavorants, the unpopped kernels can generally be reasonably separated from the popped kernels by shaking the bag before or after opening the top for access to the popped kernels, the shaking causing the unpopped kernels to gravitate into the bottom of the bag, although a substantial number of unpopped kernels may be mixed with the popped kernels lying on the bottom of the bag.

As to microwave in-bag popping with a sticky flavor system, a major problem has been experienced due to the tendency of unpopped kernels to adhere to the sticky popped kernels by virtue of the viscous condition of the sticky flavor system at least while it is still hot. When a bag of freshly microwave popped sticky flavorant coated popcorn has been thoroughly shaken unpopped kernels will gravitate toward the bottom of the bag. However, any unpopped kernels in or on the edible popped popcorn are at best a nuisance and at worst a tooth damage liability.

SUMMARY OF THE PRESENT INVENTION

It is to the alleviation of the problem of unpopped kernels remaining in intimate relation with the edible popped popcorn in an in-bag microwave package that the present invention is directed.

It is, accordingly, an important object of the present invention to provide a microwave popcorn package which is equipped for efficient separation of unpopped kernels from popped popcorn kernels.

Another object of the invention is to provide a new and improved separator means for screening unpopped kernels from popped kernels in a microwave in-bag popping package.

Yet still another object of the invention is to provide new and improved unpopped kernel separator means in an in-bag microwave popcorn popping package, especially useful for providing one step sweet coated popcorn such as caramel corn, that is, where the flavorant is added to the unpopped popcorn prior to microwaving, as compared to two step wherein the flavorant is added after popping.

Pursuant to the present invention, there is provided a package structure for microwave popping of popcorn comprising a normally collapsed internal pressure expansible bag having a generally tubular body with a completely closed bottom end and an opposite dispensing end which is normally closed when the package has been loaded with unpopped popcorn and will remain closed during microwave popping but which can be opened for pouring popped corn from the package, a separate screen dividing the tubular body intermediate its ends into a first major length portion defining a combined unpopped popcorn space and popped popcorn chamber adjacent to the dispensing end, and into a minor length portion adjacent to the bottom end defining a pocket for receiving unpopped popcorn kernels, screen means on the separator screen large enough for selectively passing unpopped popcorn kernels from the chamber into the pocket by shaking the package after popping has been completed for separating unpopped kernels from the popped kernels in the chamber but small enough for retaining the popped kernels within the chamber, and rim means on the separator screen for impeding projection of unpopped kernels from the chamber into the pocket during popping and for blocking return of the unpopped kernels from the pocket to the chamber during pouring of popcorn from the opened dispensing end.

There is also provided by the present invention in a method for microwave popping of popcorn, providing a microwave popcorn package structure comprising a normally collapsed bag expansible by internal pressure and having a generally tubular body with a completely closed bottom end and an opposite dispensing end which is normally closed when the package has been loaded with unpopped popcorn and will remain closed during microwave popping but which can be opened for pouring popped corn from the package, providing a separator screen dividing the tubular body intermediate its ends into a first major length portion defining a combined unpopped popcorn space and popped popcorn chamber adjacent to the dispensing end, and into a minor length portion adjacent to the bottom end defining a pocket for receiving spent unpopped popcorn kernels, providing the separator screen with screen means large enough for selectively passing unpopped popcorn kernels from the chamber into the pocket by shaking the package after popping has been completed for separating unpopped kernels from the popped kernels remaining in the chamber, and providing the separator screen with rim means for impeding projection of unpopped kernels from the chamber into the pocket during popping and for blocking return of the spent unpopped kernels from the pocket into the chamber during pouring of popcorn from the opened dispensing end.

BRIEF DESCRIPTION OF THE DRAWINGS

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which.

DETAILED DESCRIPTION

Figure 1:
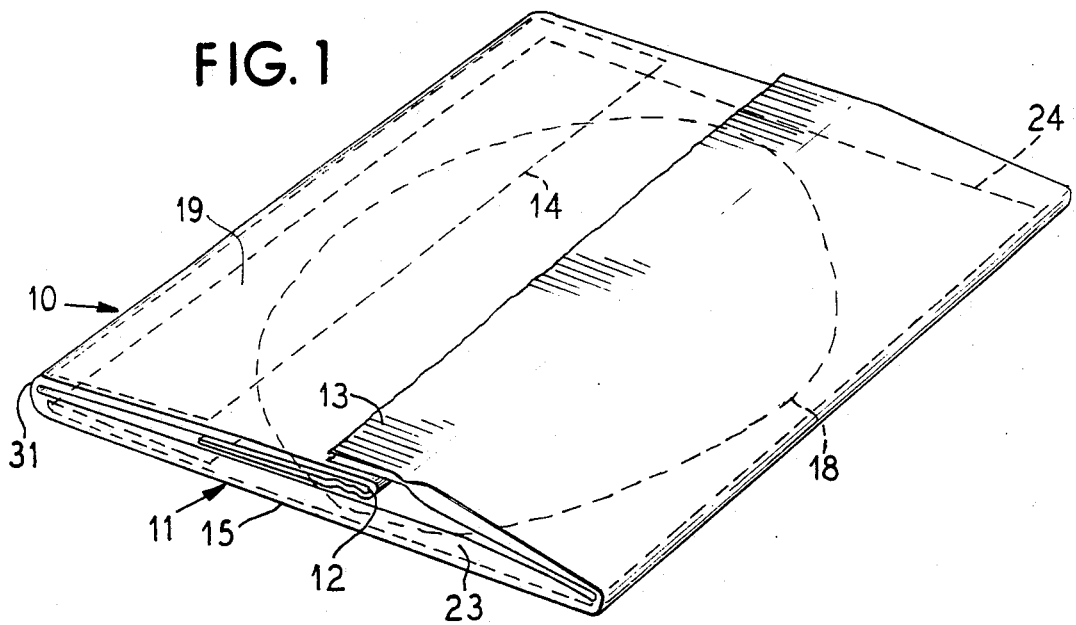
FIG. 1 is a perspective view showing a microwave popcorn package embodying the present invention.
Figure 2:
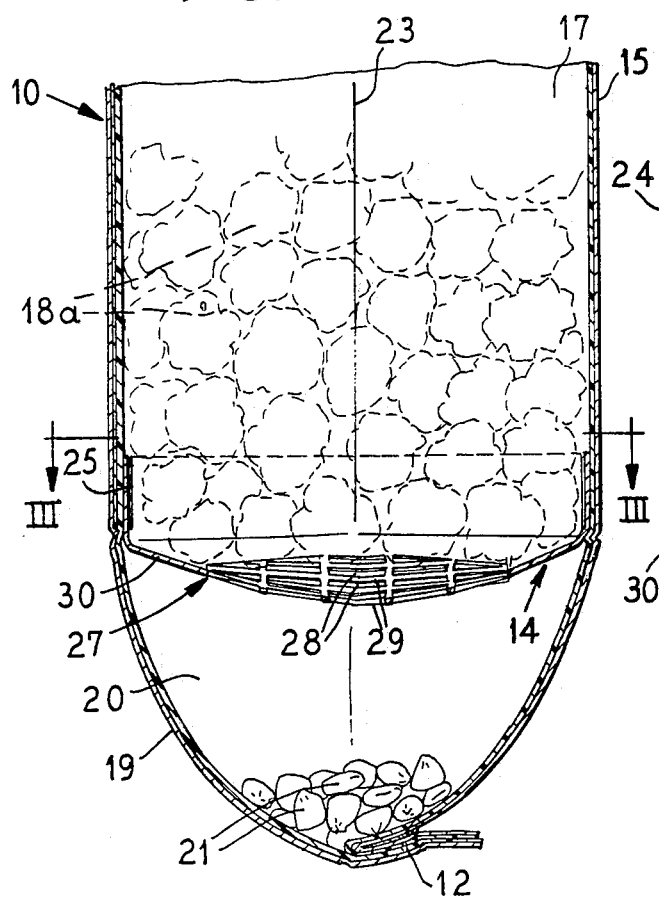
FIG. 2 is a fragmentary vertical sectional detail view of the package of FIG. 1 but showing the bag expanded after microwave popping.
Figure 3:
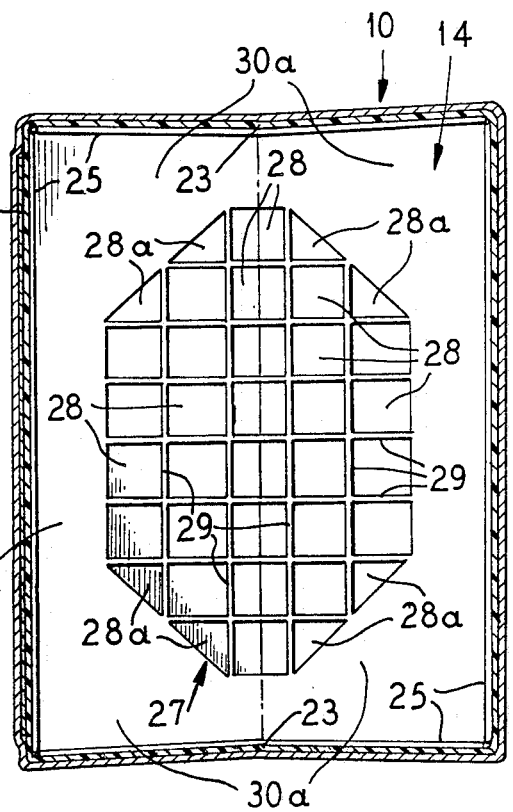
FIG. 3 is a plan sectional view taken substantially along the line III—III of FIG. 2 and showing the separator screen especially constructed for separating unpopped kernels for popcorn coated with a sweet sticky coating such as caramel.

Referring to FIGS. 1, 2 and 3, one best mode package structure 10 for microwave popping of sticky coated popcorn comprises a more or less conventional expansible bag having a tubular body 11 with a completely closed bottom end 12, in this instance of the pinch bottom type, and a dispensing end 13 which is sealed as is customary with a peel seal which can be opened after popping has been completed. According to the present invention, a separator screen 14 is provided, which divides the tubular bag body 11 intermediate its ends into a first major length portion 15 defining a space 17 for raw unpopped popcorn 18 (FIG. 1) in the collapsed condition of the bag body 11 as well as a chamber for popped popcorn 18a (FIG. 2) when the bag is expanded as a result of microwave popping. The remainder of the bag is divided by the separator 14 into a second minor length portion 19 adjacent to the bottom end 12 defining a pocket 20 for receiving spent unpopped popcorn kernels 21.

The bag 11 may be of more or less conventional construction wherein the tubular body 11 has at opposite sides similar gussets 23 to facilitate collapsing with a desirable load of the raw unpopped popcorn 18. At its closed bottom end 12, the tubular bag body is sealed permanently closed in any suitable manner and the minor length portion 19 of the bag is folded over substantially as shown in FIG. 1 onto the major length portion 15, and with the separator screen 14 substantially folded into the fold. For efficient utilization of microwave energy during microwave popping, one wall of the bag may be equipped with a receptor or suseptor film 24 which per se does not form part of the present invention. For storage convenience the upper part of the major length portion 15 is folded over onto the adjacent part of this bag portion.

Desirably the separator screen 14 comprises a one piece panel formed from a suitable flexible material, such as paper or laminate similar to that from which the bag body 11 may be constructed. The body of the separator screen should be of ample dimensions to fit within the expanded tubular bag body, with an attachment flange 25 of substantial width secured fixedly as by means of adhesive, or where conditions permit by fusion or heat sealing to the surrounding walls of the bag body in sufficiently close relation to retain the raw popcorn 18 within the space 17 before popping, and then the popped popcorn 18a within the chamber defined by the space after a popping operation. As shown, the corners of the attachment flange 25 may be miter folded into the corners of the tubular bag body.

Screen means 27 preferably located centrally on the separator screen 14 comprises a pattern array of holes 28 separated by thin dividers 29, and of a size which will permit the unpopped popcorn kernels 21 to pass efficiently from the popping chamber 17 into the pocket 20, while retaining the popped popcorn 18a within the chamber 17. After considerable experimentation, an arrangement of holes in the screen means 27 best suited for caramel coated popcorn has been found to comprise, as shown in FIG. 3, twenty-eight of the full size holes 28, and eight half holes 28a at the corners of the screen grid pattern split on the diagonal.

About the screen means 27, rim means 30 on the separator screen 14 blocks return of the spent unpopped kernels 21 from the pocket 20 to the chamber 17 when pouring the popped popcorn from the bag 11 after the dispensing end 13 has been opened from its customary peel sealed condition after the popping has been completed. For best results, the rim 30 should be of substantially uniform width surrounding the screen grid means 27.

Good results for microwave popped caramel popcorn have been obtained with the screen holes 28, 28a punched in an elongated generally octagonal grid of about ½ inch square full size holes and ½ inch triangular half size holes, the dividers in the form of about 1/32 inch width bars, and the rim 30 of about 5/8 inch width at its narrowest in a bag of transverse expanded tubular dimensions of about 4"×5½". Between the diagonal corners of the screen grid means 27 and the generally rectangular corners of the separator screen panel 14, the rim 30 has generally triangular larger barrier areas 30a.

Preferably, the separator screen 14 is attached in a plane substantially coincident with fold line 31 where the folded-over minor length portion 19 joins the major length portion 15. In the collapsed condition of the bag the panel portion of the screen separator 14 folds into the collapsed minor length portion 19 while the attachment flange 25 remains on the portion 15 of the collapsed bag.

During microwave popping, the expanded popcorn within the chamber 17 and steam that may be generated, puffs the bag body 11 into expanded condition and pulls the separator screen 14 into spread out position where it provides a barrier to escape of the expanded popped kernels into the pocket 20, because the openings 28, 28a have been calculated to be sufficiently smaller than even a below average diameter of the expanded popped kernels 18a. After popping has been completed, the now puffed out, expanded microwave popcorn package 10 is shaken several times in a generally upright position so that the unpopped or only fractionally expanded kernels 21 will drop toward and through the screen means 27 by virtue of the screen holes 28 being larger than the unpopped or only slightly expanded kernels 21.

A desirable attribute of the separator screen 14 for enhancing shaking out separation of the unpopped kernels 21 from the mass of popped kernels above the separator screen resides in that as a result of the folding of the screen member toward the bottom end 12 in the collapsed condition of the bag, and the weight of the popped popcorn on the spread out or expanded separator screen 14, the separator screen tends to cup or bow downwardly and thereby, in effect, cause the descending unpopped kernels 21 to funnel toward and through the screen means 27.

After the unpopped kernels 21 have been shaken out of the mass of popped kernels 18a, desirably while the popped popcorn mass is still warm enough for the sugary, relatively viscous coating to still be in a fairly liquid state so that escape of the unpopped kernels to the pocket 20 is facilitated, it may be desired to pour the popped popcorn 18a from the bag into a suitable receptacle such as a dish for convenient consumption. During the pouring, regardless of how the bag is tilted for discharging the popcorn through the now opened dispensing end 13, the spent unpopped kernels 21 are blocked against return from the pocket 20 to the chamber 17 by virtue of the rim 30. It has been observed that where the unpopped kernels are residually coated with the sugary, e.g. caramel, coating material desirably provided for the edible popped popcorn, there is a tendency for the separated unpopped kernels 21 to adhere to the downside wall areas within the pocket 20 during the popcorn pouring activity. The sticky unpopped kernels 21 tend to slide toward, rather than to tumble toward the retaining rim 30, and thus actually resist escape from the pocket 20 to the chamber 17.

Figure 4:
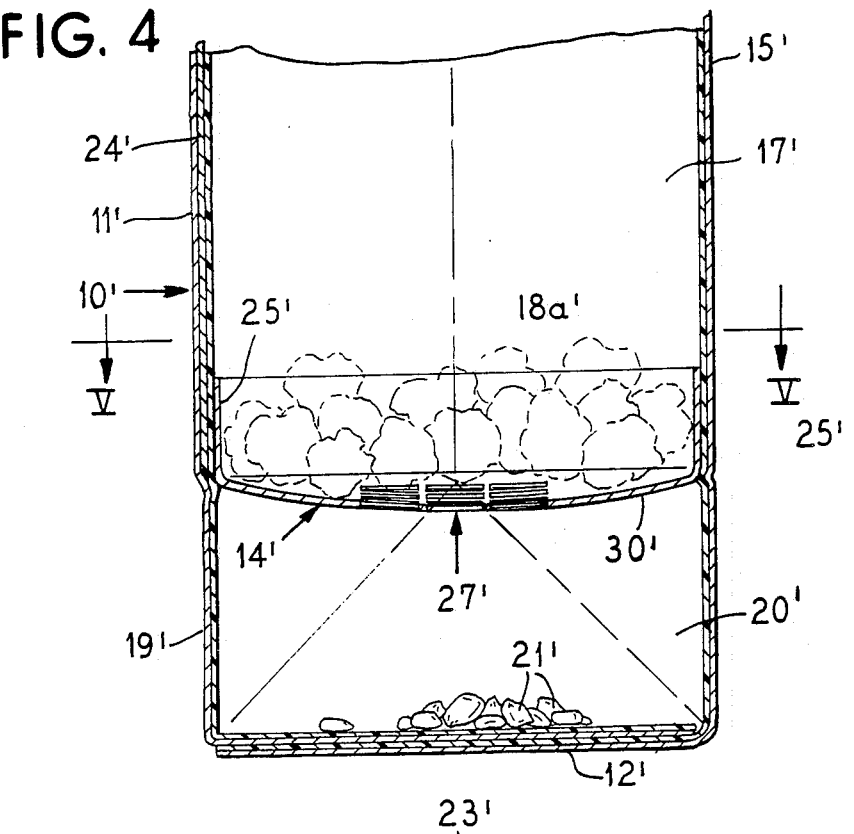
FIG. 4 is a view similar to FIG. 2 but showing a flat bottom bag instead of a pinch bottom bag.
Figure 5:
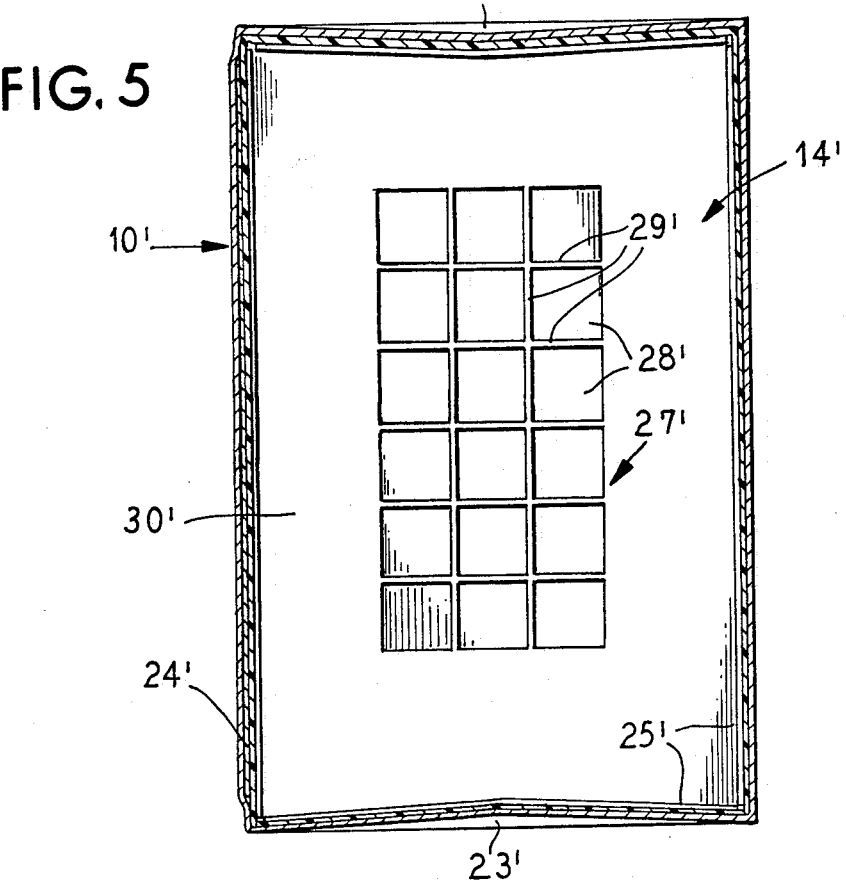
FIG. 5 is a plan sectional view taken substantially on the line V—V in FIG. 4 and showing a screen structure which is well suited for separating unpopped popcorn from plain or nonsticky flavored microwave popped popcorn.

In FIGS. 4 and 5, a microwave popcorn package 10' is depicted which is essentially the same as the microwave popcorn package 10 of FIGS. 1-3, except that an arrangement is provided which is better suited for screening out unpopped kernels from plain or nonsticky flavored microwave popcorn, and where there is no advantage from stickiness of unpopped kernels in the separation pocket assisting in resisting return of unpopped kernels from the pocket to the popped kernel chamber of the bag after microwave popping has been completed, the unpopped kernels shaken out into the pocket and pouring of the popped kernels from the opened bag is effected.

To this end, the bag 11' may, similarly as the bag 11 in FIG. 1, be of overall dimensions substantially the same as conventional microwave popcorn bags, but with the separator screen 14' modified for accommodating the plain or nonsticky flavored popcorn. Thus, the screen means 27' desirably has a smaller number of screen holes 28', such as eighteen holes arranged in a 3"×6" hole grid separated by narrow bars 29' and surrounded by a continuous rim 30' which in this instance is wider than the corresponding rim 30 in FIGS. 1-3 so as to provide more adequate barrier against return of unpopped kernels 21' from the chamber 20' to the chamber 17' when pouring the popped popcorn 18a' from the opened bag after microwave popping has been completed. Since there is no sticky surface resistance to the unpopped kernels dropping through the screen means 27' from the chamber 17', the lesser number of screen holes 28' has been found adequate for efficiently passing the unpopped kernels to the pocket 20' during shaking out after popping has been completed and desirably before the bag is opened for pouring of the popcorn therefrom. Then, the somewhat wider rim 30' efficiently retains the unpopped kernels in the pocket 20' against return to the chamber 17' even though the bag may be tilted beyond a straight horizontal position during the pouring action. By way of example, an effective width for the rim 30' has been found to be about 1 3/16 inch where the bag 11' is of the standard microwave bag cross-sectional dimensions of about 3 3/16"×6" cross section in expanded condition.

Although the closed bag bottom 12' in FIG. 4 is of the conventional square bottom bag construction, a pinch bag bottom arrangement as shown in FIG. 2 may be used instead, and conversely the bag bottom 12 in FIG. 2 may be of the square bottom form, if preferred. Both forms of bag bottoms are conventional. All other elements of the bag 11' correspond to the same elements as described in connection with FIGS. 1-3. Thus, the bag 11' has the longer portion 15' housing the chamber 17', the shorter length portion 19' housing the pocket 20', the gussets 23' and the receptor 24'. It will be understood that the attachment flanges 25' are firmly attached similarly as the flanges 25 in FIGS. 1-3 and that the separator screen 14' is foldable into the pocket 20' in the collapsed condition of the bag 11'. Further, the separator screen 14' is desirably bowed toward the bottom 12' in the expanded condition of the assembly, whereby there is a funnelling effect of the unpopped popcorn kernels 21' toward the screen means 27' during shaking out after the popping cycle has been completed and before the dispensing end of the bag is opened for pouring therefrom.

It will be understood that variations and modifications may be effected without departing from the spirit and scope of the novel concepts of the present invention.

We claim as our invention:

1. A microwave package structure enclosing unpopped popcorn for microwave popping of popcorn, comprising:
    a normally collapsed internal pressure expansible bag having a generally tubular body with a completely closed bottom end and an opposite dispensing end which is normally closed when the package has been loaded with unpopped popcorn;
    a separator screen dividing said tubular body intermediate said ends into a first major length portion defining a combined unpopped popcorn space and popped popcorn chamber adjacent to said dispensing end, and into a minor length portion adjacent to said bottom end defining a pocket for receiving unpopped popcorn kernels;
    screen means on said separator screen large enough for selectively passing unpopped popcorn kernels from said chamber into said pocket but small enough for retaining popped kernels within said chamber; and
    rim means on said separator screen for impeding projection of unpopped kernels from the chamber into the pocket during popping and for blocking return of the unpopped kernels from the pocket to the chamber during pouring of popcorn from the opened dispensing end.

2. A package structure according to claim 1, wherein said separator screen comprises a foldable panel, and said screen means comprises a grid of holes in an array in said panel generally centered within said rim on said panel surrounding said array of holes.

3. A package structure according to claim 1, wherein said screen means comprises an array of holes of about ½ inch size separated by bars of about 1/32 inch width.

4. A package according to claim 1, wherein said screen means comprises a generally octagonal array of twenty-eight about ½ inch holes and eight half holes split on the diagonal at corners of the screen means, separating bars of about 1/32 width between the holes, and said rim means comprising a rim area surrounding said screen means, and being of about 5/8 inch width at its narrowest and of larger substantially triangular areas between said diagonal corners and adjacent corners of said separator screen, so that unpopped kernels shaken out of sticky coated popcorn, such as caramel corn, through said screen means into said pocket will be accommodated efficiently against return from said pocket to said chamber when the popped popcorn is dispensed by pouring it from said dispensing end.

5. A structure according to claim 1, wherein said screen means comprises a generally rectangular array of about eighteen ½ inch holes separated by about 1/32 inch separating bars and surrounded by said rim of about 1 3/16 inches width, and especially adapted for accommodating unpopped kernels shaken from plain or nonsticky flavored microwave popcorn so that the unpopped kernels are thoroughly retained in said pocket against return to said chamber when the popcorn is poured from said chamber through said dispensing end.

6. A structure according to claim 1, wherein said screen means is substantially centered in said separator screen, and said separator screen is generally bowed toward said closed bottom end.

7. A structure according to claim 1, wherein said separator screen has a flange thereabout secured to a surrounding wall area of said tubular body.

8. A structure according to claim 7, wherein said collapsed bag body is bent along a line substantially coincident with said separator screen and with said screen folded into said pocket, and said minor length portion is folded onto said major length portion.

9. A structure according to claim 1, wherein said popcorn space confines a predetermined volume of unpopped popcorn in the collapsed bag, said minor length portion is folded onto said major length portion in the collapsed condition of the bag, and said separator screen is attached to said tubular body along a line on which said minor length portion is folded relative to the major length portion.

10. In a method for microwave popping of popcorn:
providing a microwave popcorn package structure comprising a normally collapsed bag expansible by internal pressure and having a generally tubular body with a completely closed bottom end and an opposite dispensing end which is normally closed when the package has been loaded with unpopped popcorn;
providing a separator screen dividing said tubular body intermediate said ends into a first major length portion defining a combined unpopped popcorn space and popped popcorn chamber adjacent to said dispensing end, and into a minor length portion adjacent to said bottom end defining a pocket for receiving unpopped popcorn kernels;
providing said separator screen with screen means large enough for selectively passing unpopped popcorn kernels from said chamber into said pocket but small enough for retaining popped kernels within said chamber;
providing said separator screen with rim means for impeding projection of unpopped kernels from the chamber into the pocket during popping and for blocking return of the unpopped kernels from the pocket to the chamber during pouring of popcorn from the opened dispensing end;
loading a predetermined volume of unpopped popcorn into said chamber of the bag and sealing the bag; and
subjecting the popcorn within the closed bag to microwave popping heat and thereby causing expansion of the bag with the popped popcorn retained therein and after the popping shaking unpopped kernels through said screen into said pocket.

11. A method according to claim 10, comprising providing said separator screen as a foldable panel, and providing said screen means as a grid of holes in an array in said panel generally centered within said rim on said panel surrounding said array of holes.

12. A method according to claim 10, comprising providing said screen means as an array of holes of about ½ inch size separated by bars of about 1/32 inch width.

13. A method according to claim 10, comprising providing said screen means in a generally octagonal array of twentyeight about ½ inch holes and eight half holes split on the diagonal at corners of the screen means, providing separating bars of about 1/32 inch width between the holes, and providing said rim means with a rim area of about 5/8 inch width at its narrowest and of larger substantially triangular areas between said diagonal corners and adjacent corners of said separator screen and surrounding said screen means, so that unpopped kernels shaken out of sticky coated popcorn, such as caramel corn, through said screen means into said pocket will be accommodated efficiently against return from said pocket to said chamber when the popped popcorn is dispensed by pouring it from said dispensing end.

14. A method according to claim 10, comprising providing said screen means with a generally rectangular array of about eighteen ½ inch holes separated by about 1/32 inch separating bars and surrounded by said rim of about 1 3/16 inches width, and especially adapted for accommodating spent unpopped kernels shaken from plain or nonsticky flavored microwave popcorn so that the unpopped kernels are thoroughly retained in said pocket against return to said chamber when the popcorn is poured from said chamber through said dispensing end.

15. A method according to claim 10, comprising providing said screen means about centered in said separator screen, and constructing said separator screen to generally bow toward said closed bottom end.

16. A method according to claim 10, comprising providing said separator screen with a flange thereabout secured to a surrounding wall area of said tubular body.

17. A method according to claim 16, comprising bending said collapsed bag body along a line substantially coincident with said separator screen and folding said screen into said pocket, and folding said minor length portion onto said major length portion.

18. A method according to claim 10, comprising folding said minor length portion onto said major length portion in the collapsed condition of the bag, and attaching said separator screen to said tubular body along a line on which said minor length portion is bent in folding the minor length portion onto the major length portion.

* * * * *